3,033,720
AMINOPLASTS-CONTAINING LAYER FORM STRUCTURES OF IMPROVED RESISTANCE TO LIGHT
Adolf Emil Siegrist, Basel, and Max Duennenberger, Birsfelden, Switzerland, assignors to Ciba Limited, Basel, Switzerland
No Drawing. Filed May 1, 1958, Ser. No. 732,148
Claims priority, application Switzerland May 16, 1957
5 Claims. (Cl. 154—46)

The present invention provides aminoplasts-containing layer-form structures of improved resistance to light.

The invention is concerned broadly with the use of 2:4-dihydroxybenzoyl-furan of the formula

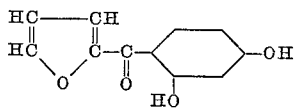

as a light protecting agent in layer-form structures (laminates) containing aminoplasts.

The 2:4-dihydroxybenzoyl-furan can be used in the case of any aminoplasts employed for layer-form structures, for example urethane resins, sulfonamide resins, dicyandiamide resins, aniline resins, urea resins and especially melamine resins.

Thus, for example, urea-formaldehyde resins are concerned. These can be derived from methylol ureas from 1 mol of urea and 2 to 4 mols of formaldehyde or from the alkyl ethers of these methylol compounds with low molecular alcohols such as methanol or n-butanol.

There are further concerned condensation compounds of formaldehyde with such compounds, for example dicyandiamide or melamine, as contain at least once the atom grouping

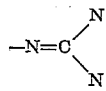

or as for example cyanamide, are easily converted into such compounds.

The formaldehyde condensation products concerned in the present case can be derived from a wide variety of compounds with the specified atom grouping, both cyclic and also acyclic. Among the acyclic compounds may be mentioned, for example, dicyandiamide, dicyandiamidine, guanidine, acetoguanidine and biguanide. Suitable condensation products are such, for example, as are produced by the use of more than 1 mol, for example from 2–4 mols or more of formaldehyde, calculated on 1 mol of the compound containing at least once the atom grouping

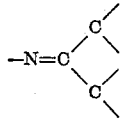

Such condensation products can be used as are obtained in a neutral, alkaline or acid medium.

The condensation products concerned in the present case from formaldehyde and cyclic compounds containing at least once the atom grouping,

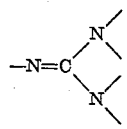

are preferably derived from aminotriazines. Methylol compounds of aminotrazines or their ethers or esters are concerned. Among the compounds there may primarily be mentioned reaction products of formaldehyde and 2:4:6-triamine-1:3:5-triazine, usually known as melamine. Such condensation products can contain 1–6 methylol groups; they usually constitute mixtures of different compounds. Moreover methylol compounds of such derivatives of melamine are concerned as still contain at least one amino group, for example methylol compounds of melam, melem, ammeline, ammelide or of halogen substituted aminotriazines, such as 2-chloro-4:6-diamino-1:3:5-triazine; or also methylol compounds of guanamines, for example benzoguanamine, acetoguanamine or formoguanamine.

Ternary, basic condensation products are also concerned, which are obtained when in any desired sequence there are reacted together (a) methylol compounds of aminotriazines or their ethers with low molecular alcohols (b) aliphatic compounds containing a carbon chain of at least seven carbon atoms and a reactive hydrogen atom attached to a hetero atom and (c) primary or secondary amines or such tertiary amines as contain in the molecule a reactive hydrogen atom attached to an oxygen, sulfur or another, non-basic nitrogen atom.

Formaldehyde condensation products of formaldehyde and guanyl-melamines can also be employed in the execution of the present invention. Such condensation products can be derived from mono-, di- or tri-guanyl melamine or mixtures thereof obtainable by treating dicyandiamide in an inert solvent in the hot with gaseous hydrogen halides and separating the free amines by addition of strong alkalies from the salts produced. Also substituted guanyl melamines can be used for the production of formaldehyde condensation products.

The salts of the formaldehyde condensation products, which can also be used instead of the free basic condensation products, can be derived from inorganic acids, such as hydrochloric acid or sulfuric acid, or from organic acids, especially from low molecular aliphatic acids, such as formic, acetic, propionic or glycollic acid.

Depending on the nature of the material concerned, considerations as to activity and permanence and other requirements, the quantities of the 2:4-dihydroxybenzoylfuran to be incorporated with the aminoplasts concerned can vary within fairly wide limits, for example about 0.01 to 10%, preferably 0.1 to 2% of the material intended to be protected directly against injurious ultra violet rays.

The 2:4-dihydroxybenzoyl-furan is intended to be added to the aminoplasts at a stage in their working up at which it can still be incorporated easily in a fine state of distribution. Since it is easily soluble in numerous organic solvents, including such as are miscible with water, there is in general no difficulty in achieving the desired fine state of distribution. It will be obvious to those skilled in the art when and how the 2:4-dihydroxybenzoyl-furan can be incorporated in the aminoplasts.

A particularly favorable effect is attained by the use of 2:4-dihydroxybenzoyl-furan when the aminoplasts themselves or layers beneath the aminoplasts in the layer-form structures, also contain dyestuffs, for example pigments. It is known that many dyestuffs and pigments have an unsatisfactory fastness to light and dyed materials are particularly light sensitive when they only contain small quantities of dyestuffs (in the case of so-called pastel shades). By the addition of 2:4-dihydroxybenzoyl-furan to the aminoplasts a marked improvement can be achieved in this case.

The use of 2:4-dihydroxybenzoyl-furan in aminoplasts of layer-form structures is primarily advantageous because this compound, in a surprising manner, is resistant to the action of light in the aminoplasts themselves, whereas its activity in other substances is relatively rapidly reduced under the influence of the light, as will be obvious from the following description of an experiment with acetyl cellulose.

From a 10% acetyl cellulose solution in acetone containing, calculated on the acetyl cellulose, 1% of 2:4-dihydroxybenzoyl-furan of the formula

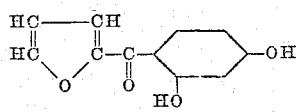

a film of about 40μ thickness was produced. After drying, the following values for percentage transmittancy were obtained:

| Wave Length in mμ | Transmittancy for ultra violet rays in percent | |
|---|---|---|
| | unexposed | after 100 hours exposure in a fadeometer |
| 250 | 4 | 4 |
| 260 | 16 | 3.5 |
| 270 | 3.5 | 10 |
| 280 | 0.5 | 16 |
| 290 | 0 | 18 |
| 300 | 0 | 21 |
| 310 | 0 | 32.5 |
| 320 | 0 | 50 |
| 330 | 0 | 62 |
| 340 | 0 | 73 |
| 350 | 0 | 79 |
| 360 | 0.5 | 81.5 |
| 370 | 2.5 | 83 |
| 380 | 14.5 | 84 |
| 390 | 42 | 84.5 |
| 400 | 68 | 85 |

The following example illustrates the invention, the parts and percentages being by weight unless otherwise stated and the relation between part by weight and part by volume being the same as that between the kilogram and the liter.

*Example*

In a hollander a paper pulp is prepared consisting of
150 parts of bleached sulfite or sulfate cellulose,
60 parts of zinc sulfide,
0.9 part of a finely dispersed, aqueous paste containing 17% of the azo pigment from diazotized 1-amino-2-chloro-5-trifluoromethylbenzene and 2-hydroxy-naphthalene-3-carboxylic acid-o-methoxy-phenylamide, and about
5,000 parts of water.

A paper produced from this pulp is introduced into a bath consisting of
100 parts of a hardenable, water-soluble condensation product in powder form from 1 mol of melamine and about 2 mols of formaldehyde.
100 parts by volume of a mixture obtained from a solution of 1 part of 2:4-dihydroxy-benzoyl-furan in 19 parts by volume of ethanol by dilution with water to 100 parts by volume.

After removal of the excess of resin solution, the paper is dried.

The paper treated in this manner is brought into contact with a support consisting of tissue paper impregnated with melamine resin of the above composition, a layer of phenol paper and as intermediate layer filter paper impregnated with melamine resin of the above composition and the whole moulded for 10 minutes at 140–150° C. under 75 kg./cm.² pressure.

The resulting laminate exhibits after exposure in a fadeometer a fastness to light about 3 units better than a laminate produced without 2:4-dihydroxybenzoyl-furan.

Instead of the above specified azo pigment, the dyestuffs of the following formulae can also be used, laminates likewise being obtained having a fastness to light considerably better than similar laminates produced without the addition of 2:4-dihydroxybenzoyl-furan:

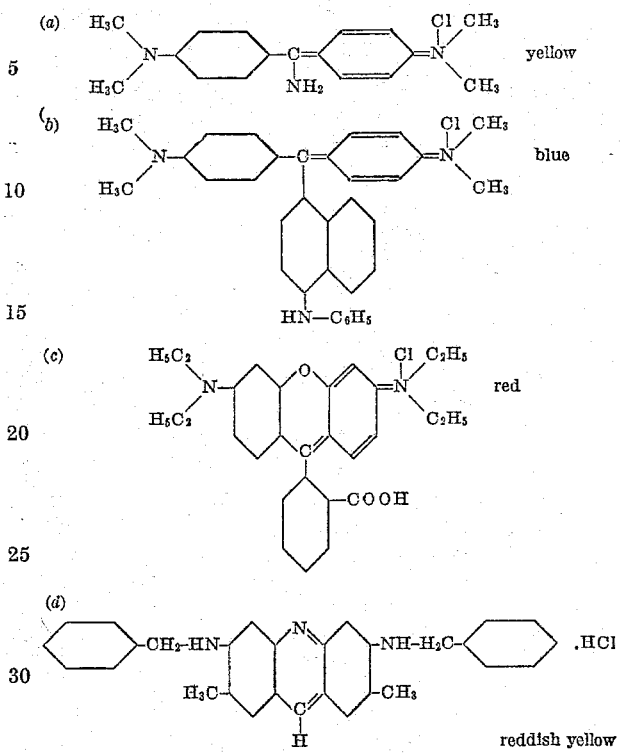

For fixing these dyestuffs 6 parts of aluminum sulfate and 3 parts of sodium di-isobutylnaphthalene sulfonate are added.

What is claimed is:
1. A paper laminate containing a melamine-formaldehyde resin and incorporated in the latter 0.01 to 10% of 2:4-dihydroxybenzoyl-furan.
2. A paper laminate containing a melamine-formaldehyde resin from a water-soluble, hardenable condensation product from 1 molecular proportion of melamine and about 2 molecular proportions of formaldehyde, and containing incorporated in the melamine-formaldehyde resin 0.01 to 10% of 2:4-dihydroxybenzoyl-furan.
3. A pigmented paper laminate containing a melamine-formaldehyde resin from a water-soluble, hardenable condensation product from 1 molecular proportion of melamine and about 2 molecular proportions of formaldehyde, and containing incorporated in the melamine-formaldehyde resin 0.01 to 10% of 2:4-dihydroxybenzoyl-furan.
4. A paper laminate containing at least one layer of pigmented paper which has been impregnated with an aqueous solution of a water-soluble hardenable condensation product from 1 molecular proportion of melamine and about 2 molecular proportions of formaldehyde which solution contains 0.01 to 10% of 2:4-dihydroxybenzoyl-furan, calculated on the quantity of said condensation product.
5. In the process for the manufacture of paper laminates containing a melamine-formaldehyde resin the step which comprises incorporating with the melamine-formaldehyde resin 0.01 to 10% of 2:4-dihydroxybenzoyl-furan, calculated on the quantity of the melamine-formaldehyde resin.

References Cited in the file of this patent
UNITED STATES PATENTS

| 2,568,894 | Mackey | Sept. 25, 1951 |
| 2,943,013 | Arledter | June 28, 1960 |

FOREIGN PATENTS

| 1,004,045 | Germany | Mar. 7, 1957 |

UNITED STATES PATENT OFFICE
CERTIFICATE OF CORRECTION

Patent No. 3,033,720

May 8, 1962

Adolf Emil Siegrist et al.

It is hereby certified that error appears in the above numbered patent requiring correction and that the said Letters Patent should read as corrected below.

Column 1, lines 52 to 57, the formula should appear as shown below instead of as in the patent:

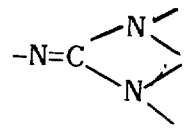

Signed and sealed this 14th day of May 1963.

(SEAL)
Attest:

ERNEST W. SWIDER
Attesting Officer

DAVID L. LADD
Commissioner of Patents